Figure 1:
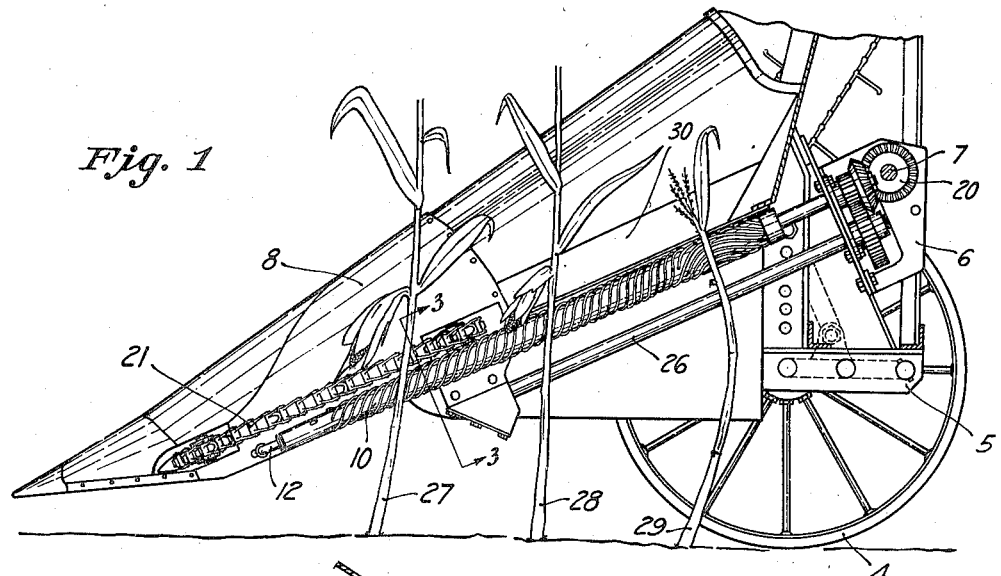

Aug. 12, 1941.  R. H. BLANK  2,252,159
CORN PICKER
Filed May 2, 1940

INVENTOR.
R. H. BLANK
BY *William C. Blackburn*
ATTORNEY

Patented Aug. 12, 1941

2,252,159

UNITED STATES PATENT OFFICE 2,252,159

CORN PICKER

Rudolph H. Blank, Walcott, Iowa

Application May 2, 1940, Serial No. 332,909

4 Claims. (Cl. 56—104)

My present invention relates to improvements in corn pickers of the type now conventional which are drawn by a tractor about the field and pick the corn without cutting. These improvements, while being connected with the snapping rollers, substantially improve and simplify the picker as a whole.

As is known by all persons who have a practical knowledge of corn pickers, it is desirable that the structure be such as to eliminate the dangers common in this type of machine and evidenced by the hundreds of reported accidents which occur every year, and the many times as many which occur and which are not reported. Many of the accidents are fatal, and the rest involve the loss of at least one or more fingers and quite often the hand or more. Furthermore, the snapping rollers will generally leave at least four bushels of husks on each hundred bushels of corn which, if not cleaned, brings a lower price than otherwise. Particularly with the new hybrid corns but also with other corns, there is considerable shelling produced by the snapping rollers, the corn shelled being left in the field. Finally, the snapping rollers continually become jammed, necessitating cleaning out between the rollers.

The remedy for the dangerous characteristic has been to place a warning sign on the picker instructing the user not to get the hands near the rollers. However, this does little good since, when the rollers become jammed due to the rollers slipping on a local overload and failing to drive such overload through, the only known way of clearing is to try to separate the jammed material by hand and with a stick with the rollers running. When the rollers again take a hold, unless the operator is extremely dexterous, the hand will be drawn between the rollers. To remedy the failure of the rolls to husk properly, recleaners are added at considerable expense. No remedy for shelling has heretofore been found.

In present pickers, reliance is placed upon fingers moving above the rollers, which are for elevating picked ears of corn to the upper ends of the rollers, also to drag the stalks backward between the rollers. These fingers, however, do not succeed in dragging the stalks rearwardly between the rollers. In actual operation, the stalks are fed downwardly between the rollers at the lower end of the rollers so that all the picking is done at the lower ends of the rollers. This results in excessive wear on the rollers. However, under certain moisture conditions, i. e., during the heat of the day, the lower ends of the rollers are adjusted apart to let the stalks move freely between the rollers. This results in the stalks of a single hill being jambed together, this being one of the causes of clogging of the rollers.

It is accordingly an object of this invention to provide a corn picker with rollers obviating the above described drawbacks with the rollers heretofore known.

It is a further object of this invention to provide a corn picker with rollers which of themselves guide stalks rearwardly therebetween to their upper ends where the stalks are fed downwardly between the rollers, and which husk corn so clean without shelling that recleaning is unnecessary.

Figure 3:
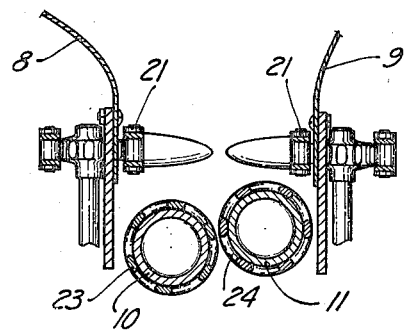
Figure 2:
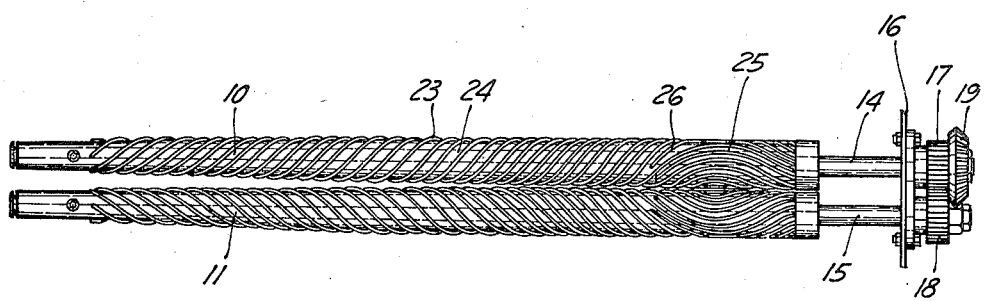

This invention is more particularly illustrated in the accompanying drawing in which, Fig. 1 is a longitudinal section through a corn picker in accordance with the present invention taken on a plane between the snapping rollers, showing characteristic corn stalks being handled by the picker;

Fig. 2 is an elevation of a pair of rollers in accordance with this invention; and Fig. 3 is a section on the line 3—3 in Fig. 1.

In the picker shown, a pair of wheels, one of which is shown at 4, is connected together by a frame 5. A pair of frame plates, one of which is shown at 6, carries rotatably the power shaft 7 which is driven through gearing from the power take-off of the tractor.

The customary gatherers 8 and 9 are provided, extending forwardly from the frame, and are carried thereby, and, as is well known, travel between the rows of corn.

The snapping rollers 10, 11 are positioned between the gatherers 8 and 9 in juxtaposition, with their lower ends supported by brackets 12, and with shafts 14, 15 secured in their upper ends, extending through frame member 16 into driving engagement with interengaging gears 17, 18. The shaft 14 also has secured thereto, outwardly of the gear 17, a bevel gear 19 for engagement with a bevel gear 20 drivingly carried by the power shaft 7.

A pair of corn-elevating conveyors 21, consisting of a pair of endless toothed chains, is positioned adjacent, and with the teeth above the forward portions of the rollers. Suitable driving means 22 are provided for driving the conveyors from the drive shaft 7.

The rollers 10, 11 are each formed of a cylinder, tapered at its forward end, and provided with a plurality of ribs 23 spirally arranged thereabout in opposite directions. The pitch of the spirals is such that the ribs on the facing sides of the rollers are generally vertical. It is obvious that the more ribs which are placed on the rollers the smaller will be the channels 24 between the ribs.

The number of ribs employed should be sufficiently small that the channel between adjacent ribs is large enough to receive an average size corn stalk but sufficiently great that the channels will ordinarily not receive two or more stalks. While I have in the drawing shown six ribs on the rollers, this number is not definitely fixed since it changes with the diameter of the rollers in order to maintain both the channel size and the vertical positioning of the ribs on facing surfaces of the rollers.

While the pitch of the ribs results in the spiral ribs being generally vertical on facing surfaces of the rollers, it may be noted that at the forward ends the pitch is slightly greater than in the central portion of the rollers. This effects picking up of down corn.

The spiral portions of the rollers just described effect guiding of the stalks rearwardly between the rollers and occupy a major portion of the length of the rollers. A short minor portion of the rollers at their upper ends is formed as a feeding section 25 which will rapidly feed the upper ends of the stalks downwardly between the rolls. Any ears on the upper ends of the stalks will of course be removed thereby. This feeding section is preferably composed of ribs which may be extensions of the ribs 23 which, for the purpose of feeding, are curved into a reverse spiral. There are provided in feeding section 25 supplementary ribs 26 between the ribs 23 which together produce a rough feeding surface but of sufficient continuity to prevent this section from gripping the end of an ear of corn and shelling such end.

The drive of the shaft 7 is so proportioned to the drive of the picker that the generally vertical channels defined between the snapping rollers move rearwardly at substantially the same speed at which the picker is drawn along the field. It should be noted in this connection that the channels between the ribs on each roller cooperate with the channels on the other roller to form together a single channel.

Very satisfactory results have been accomplished by the use of a one-fourth inch rod spirally wound and welded to the cylinders. This affords a round outer surface to the ribs which assists to some extent in preventing the stalks from being gripped by the ribs.

In operation, as is customary, the picker is drawn along the field by a tractor, and the power shaft 7 is driven from the power take-off. A row of hills enters between the rollers 10 and 11. The forward portions of the rollers, which are tapered, guide the stalks, one of which is shown at 27, rearwardly slightly faster than the picker travels, and the stalks are distributed in the tapered portion so that not more than one stalk is positioned in a single channel. The rollers, due to their rotating at a speed to draw the stalks backward at about the speed of travel, have their surfaces which contact the stalks sliding downwardly thereon. Therefore, if the channels between the ribs are considerably obstructed or if considerable interruptions are formed in the ribs, the stalks will be forced downwardly and broken against the ground by the guiding sections of the rollers.

The stalk 28, as shown in Fig. 1, has been guided rearwardly to a point at which the ear on the stalk is going to be snapped off, the stalk in this position remaining standing. The stalk 29, as shown, has been guided rearwardly to the feeding portion 25, and is being fed downwardly between the rollers without being substantially damaged.

The husks will be gripped between the ribs, the rollers being so synchronized that channels on one roller are adjacent channels on the facing surface of the other roller, and the ribs likewise matching. After the husks are torn off, the ears fall into the opening 30, which opens into a container from which, as is customary, the ears are removed by a flexible conveyor belt and conveyed to a wagon or other suitable vehicle. Contrary to customary belief, I have found that rough rollers are not necessary for husking, but that a pair of rollers, as described, husks more satisfactorily than rough rollers, and that these rollers in pairs do not do any substantial shelling. With rollers of this type used in pairs, the smoother the roller the better the action. Inasmuch as clogging is entirely eliminated, there is no substantial hazard in the use of the machine.

Having now described my invention, I claim:

1. In a corn picker, the combination comprising a pair of cooperating snapping rollers, both of said rollers being provided with a plurality of substantially continuous spiral ribs extending from portions adjacent the upper rearward ends of the rollers to points adjacent to lower front ends of the rollers, the ribs on said rollers being spiraled in opposite directions and the spirals on the two rollers having substantially the same pitch, said spiral ribs defining channels therebetween, which channels are substantially free of obstructions, the channels on the adjacent sides of the rollers being complemental and generally vertical, said ribs effecting guiding of stalks rearwardly between the rollers, and means projecting from the faces of the rollers at the upper rearward ends thereof for feeding stalks downwardly between the rollers, said means comprising continuations of said ribs curved in the opposite direction from the main part thereof whereby to prevent the stalks from being fed beyond the ends of the rollers.

2. In a corn picker, the combination comprising a pair of cooperating snapping rollers, said rollers including means extending throughout the major portion of the length thereof for guiding stalks rearwardly therebetween, means for rotating said rollers whereby to effect guiding action by said rollers, said means rotating said rollers effecting rotation at a rate proportioned to the rate of guiding movement sufficient that the rollers rub in a downward direction on stalks therebetween, said rollers in the extent of said guiding means being free of obstructions which would cause feeding of the stalks therebetween, and means at the upper rearward ends of the rollers for effecting feeding of stalks downwardly between the rollers, said feeding means comprising extensions of said guiding means curved in a reverse direction from the major portion of the length of the guiding means whereby to tend to cause feeding of stalks in a reverse direction.

3. In a corn picker of the type having a pair of inclined rollers positioned side by side to which standing stalks of corn are fed by movement of the picker in a field, and in which the rollers are rotated in a direction such that the adjacent sides thereof move downwardly, characterized by the rollers being provided with spiral guiding means extending throughout the major portion of the length of the rollers to guide stalks fed therebetween rearwardly between the rollers upon rotation thereof and being free of obstructions in the extent of said guiding means which might effect feeding of stalks downwardly therebetween, said rollers being rotated at a rate to guide stalks rearwardly at a rate generally equal to the rate of forward movement of the picker in the field, said rollers being provided upon their rear end portions with complemental similar means tending to reverse the direction of travel of the stalks between the rollers.

4. In a corn picker, the combination comprising a pair of cooperating snapping rollers, both of said rollers being provided with substantially continuous spiral ribs extending from positions adjacent the upper rearward ends of the rollers to points adjacent the lower front ends of the rollers, the ribs on said rollers being curved in opposite directions and having substantially the same pitch throughout their length, said spiral ribs defining channels therebetween, which channels are substantially free of obstructions, and means for driving said rollers in opposite directions at equal speeds, with the rollers so timed that the ribs on the facing surfaces of the rollers are substantially equally positioned longitudinally of the rollers, and the channels on one roller cooperate with the channels on the other roller in defining enclosed passages between the rollers, the pitch of the spirals being such that said passages extend substantially vertically, the spacing of spirals on each roller, throughout substantially the length thereof, being sufficient to admit one average cornstalk to be received in a single passage and insufficient to allow the reception of more than one such stalk.

RUDOLPH H. BLANK.